(12) United States Patent
Shen et al.

(10) Patent No.: US 12,517,766 B2
(45) Date of Patent: Jan. 6, 2026

(54) CONTROL METHOD AND APPARATUS OF CLUSTER RESOURCE, AND CLOUD COMPUTING SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Bowei Shen, Beijing (CN); Haifeng Du, Beijing (CN); Wenqiao Li, Beijing (CN); Jun Wang, Beijing (CN); Shi Bai, Beijing (CN); Chuyi Han, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 700 days.

(21) Appl. No.: 17/782,110

(22) PCT Filed: Sep. 24, 2020

(86) PCT No.: PCT/CN2020/117413
§ 371 (c)(1),
(2) Date: Jun. 2, 2022

(87) PCT Pub. No.: WO2021/109686
PCT Pub. Date: Jun. 10, 2021

(65) Prior Publication Data
US 2023/0004439 A1    Jan. 5, 2023

(30) Foreign Application Priority Data

Dec. 5, 2019 (CN) .......................... 201911232841.4

(51) Int. Cl.
*G06F 9/50* (2006.01)

(52) U.S. Cl.
CPC .......... *G06F 9/5055* (2013.01); *G06F 9/5022* (2013.01); *G06F 9/5027* (2013.01); *G06F 9/5077* (2013.01); *G06F 2209/5011* (2013.01)

(58) Field of Classification Search
CPC .... G06F 9/5055; G06F 9/5022; G06F 9/5027; G06F 9/5077; G06F 2209/5011
See application file for complete search history.

(56) References Cited

U.S. PATENT DOCUMENTS 7,721,292 B2 * 5/2010 Frasier .................... G06F 9/505
                                                          718/104
10,089,152 B1 * 10/2018 Kramer ................. G06F 9/4401
(Continued)

FOREIGN PATENT DOCUMENTS

| CN | 105867955 A | 8/2016 |
| CN | 109062666 A | 12/2018 |

(Continued)

OTHER PUBLICATIONS

"Communication with Supplementary European Search Report", EP Application No. 20897260.4, Nov. 27, 2023, 12 pp.
(Continued)

*Primary Examiner* — Mehran Kamran
*Assistant Examiner* — Jonathan R Labud
(74) *Attorney, Agent, or Firm* — Myers Bigel, P.A.

(57) ABSTRACT

This disclosure relates to a control method and apparatus of cluster resources, and a cloud computing system, and relates to the field of computer technologies. The method includes: in the case where a to-be-controlled resource is a to-be-expanded resource, determining a binding relationship between the to-be-expanded resource and an application; adding the to-be-expanded resource that is initialized into a (Continued)

resource pool of a corresponding application having the binding relationship with the to-be-expanded resource; generating a to-be-executed data packet of a to-be-processed application according to a deployment type of the to-be-processed application; and deploying the to-be-executed data packet on the to-be-expanded resource in the resource pool of the to-be-processed application for execution.

15 Claims, 8 Drawing Sheets

(56) References Cited

U.S. PATENT DOCUMENTS

| | | | |
|---|---|---|---|
| 10,593,009 B1* | 3/2020 | Surani | G06T 1/20 |
| 10,708,135 B1* | 7/2020 | Elliott, IV | H04L 67/1097 |
| 2002/0131404 A1* | 9/2002 | Mehta | H04L 67/2871 |
| | | | 370/352 |
| 2005/0132231 A1* | 6/2005 | Williamson | H04L 63/083 |
| | | | 726/4 |
| 2005/0144474 A1* | 6/2005 | Takala | H04L 63/168 |
| | | | 726/27 |
| 2008/0244600 A1 | 10/2008 | Wong et al. | |
| 2012/0317069 A1 | 12/2012 | Oono | |
| 2014/0047119 A1 | 2/2014 | Wong et al. | |
| 2016/0203028 A1 | 7/2016 | Wong et al. | |
| 2017/0351552 A1 | 12/2017 | Wong et al. | |
| 2018/0300116 A1 | 10/2018 | Meytin et al. | |
| 2019/0213044 A1* | 7/2019 | Cui | G06F 9/5072 |
| 2019/0286493 A1 | 9/2019 | Wong et al. | |
| 2019/0303187 A1* | 10/2019 | Vu | G06F 9/45558 |
| 2020/0401454 A1 | 12/2020 | Wong et al. | |

FOREIGN PATENT DOCUMENTS

| | | |
|---|---|---|
| CN | 109803018 A | 5/2019 |
| CN | 110333877 A | 10/2019 |
| CN | 110597623 A | 12/2019 |
| CN | 110825494 A | 2/2020 |
| CN | 110968427 A | 4/2020 |
| JP | 2011060035 A | 3/2011 |
| JP | 2019503535 A | 2/2019 |
| TW | 201812611 A | 4/2018 |
| WO | 2011105001 A1 | 9/2011 |

OTHER PUBLICATIONS

"First Office Action and English language translation", CN Application No. 201911232841.4, Jan. 10, 2022, 15 pp.

"International Search Report and English language translation", International Application No. PCT/CN2020/117413, Dec. 23, 2020, 5 pp.

"Decision to Grant a Patent and English language translation", JP Application No. 2022-534290, Apr. 15, 2025, 6 pp.

* cited by examiner

CONTROL METHOD AND APPARATUS OF CLUSTER RESOURCE, AND CLOUD COMPUTING SYSTEM

CROSS-REFERENCE TO RELATED APPLICATIONS

The present application is a U.S. National Stage Application under 35 U.S.C. § 371 of International Patent Application No. PCT/CN2020/117413, filed on Sep. 24, 2020, which is based on and claims the priority to Chinese patent application No. 201911232841.4, filed on Dec. 5, 2019, the disclosures of both of which are hereby incorporated as a whole into the present application.

TECHNICAL FIELD

This disclosure relates to the field of computer technologies, and particularly, to a control method of cluster resources, and a control apparatus of the cluster resources, a cloud computing system, and a non-volatile computer-readable storage medium.

BACKGROUND

With the continuous consumption of resources in the use of a cloud system, resource control (such as capacity expansion and contraction) needs to be performed on various products in a cluster. Such resource control becomes an operation that operation and maintenance personnel need to perform regularly.

In the related art, an expansion method is developed for an application of a certain service of a cluster in a certain specific scene.

SUMMARY

According to some embodiments of the present disclosure, there is provided a control method of cluster resources, comprising: in the case where a to-be-controlled resource is a to-be-expanded resource, determining a binding relationship between the to-be-expanded resource and an application; adding the to-be-expanded resource that is initialized into a resource pool of a corresponding application having the binding relationship with the to-be-expanded resource; generating a to-be-executed data packet of a to-be-processed application according to a deployment type of the to-be-processed application; and deploying the to-be-executed data packet on the to-be-expanded resource in the resource pool of the to-be-processed application for execution.

In some embodiments, the adding the to-be-expanded resource that is initialized into a resource pool of a corresponding application having the binding relationship with the to-be-expanded resource comprises: transferring related information of the to-be-expanded resource to a pre-script of the corresponding application; and executing the pre-script to complete the initialization of the to-be-expanded resource.

In some embodiments, the generating a to-be-executed data packet of a to-be-processed application comprises: in the case where the deployment type is package deployment, determining that the to-be-expanded resource is a physical machine, and generating a program package of the to-be-processed application as the to-be-executed data packet; and in the case where the deployment type is image deployment, determining that the to-be-expanded resource is a container image, generating a program package of the to-be-processed application, and generating the to-be-executed data packet according to the program package and a running image of the to-be-processed application.

In some embodiments, the deploying the to-be-executed data packet on the to-be-expanded resource in the resource pool of the to-be-processed application for execution comprises: in the case where the to-be-expanded resource is the physical machine, sending the to-be-executed data packet to the physical machine for execution; and in the case where the to-be-expanded resource is the container image, sending the to-be-executed data packet to an idle physical machine in a resource pool having the binding relationship with the to-be-processed application for execution.

In some embodiments, the deploying the to-be-executed data packet on the to-be-expanded resource in the resource pool of the to-be-processed application for execution comprises: acquiring related information of the to-be-expanded resource in the resource pool; and sending the related information of the to-be-expanded resource to a third-party program of the to-be-processed application through a deployment interface configured for the to-be-processed application, so that the third-party program deploys the to-be-executed data packet on the to-be-expanded resource for execution according to a deployment mode of the third-party program.

In some embodiments, the method further comprises executing a post script of the to-be-processed application, the post script being used for at least one of: returning an expansion result to a management node of a cluster; creating a volume for an expansion resource in the resource pool; or cleaning garbage generated by the expansion.

In some embodiments, the method further comprises: establishing an Secure Shell (SSH) connection with the to-be-expanded resource, for executing a related script of the corresponding application, only one SSH connection being established with the to-be-expanded resource at a time.

In some embodiments, the method further comprises: after the execution of the to-be-executed data packet of the corresponding application is finished, reserving the SSH connection within a preset time period.

In some embodiments, the method further comprises: in the case where the to-be-controlled resource is a to-be-contracted resource, determining whether there is important data in the to-be-contracted resource and whether there is a service dependent on the to-be-contracted resource; and in the case where there is no important data and there is no service dependent on the to-be-contracted resource, removing the to-be-contracted resource from the cluster.

In some embodiments, acquired related information of the to-be-contracted resource is transferred through a configured contraction interface, the acquired related information being used in the removal of the to-be-contracted resource from the cluster.

In some embodiments, the control method further comprises: acquiring a contraction result by polling a configured query interface.

In some embodiments, the method further comprises: after the to-be-contracted resource is removed from the cluster, in the case where the to-be-contracted resource is a physical machine, adding the to-be-contracted resource into the resource pool; and in the case where the to-be-contracted resource is a container image, destroying the container image and adding the to-be-contracted resource into the resource pool.

In some embodiments, the method further comprises: in the case where the to-be-contracted resource is the physical machine, executing a post script of the contraction, the post script being used for starting an installation process to perform operating system reinstallation on the to-be-contracted resource.

According to other embodiments of the present disclosure, there is provided a control apparatus of cluster resources, comprising: a determination unit configured to determine, in the case where a to-be-controlled resource is a to-be-expanded resource, a binding relationship between the to-be-expanded resource and an application; an addition unit configured to add the to-be-expanded resource that is initialized into a resource pool of the application having the binding relationship with the to-be-expanded resource; a generation unit configured to generate, according to a deployment type of a to-be-processed application, a to-be-executed data packet of the to-be-processed application; and an execution unit configured to deploy the to-be-executed data packet on the to-be-expanded resource in the resource pool of the to-be-processed application for execution.

In some embodiments, the addition unit transfers related information of the to-be-expanded resource to a pre-script of the corresponding application, and executes the pre-script to complete the initialization of the to-be-expanded resource.

In some embodiments, in the case where the deployment type is package deployment, it is determined that the to-be-expanded resource is a physical machine, and the generation unit generates a program package of the to-be-processed application as a to-be-executed data packet; and in the case where the deployment type is image deployment, it is determined that the to-be-expanded resource is a container image, the generation unit generates a program package of the to-be-processed application, and generates the to-be-executed data packet according to the program package and a running image of the to-be-processed application.

In some embodiments, the execution unit sends, in the case where the to-be-expanded resource is the physical machine, the to-be-executed data packet to the physical machine for execution; and the execution unit sends, in the case where the to-be-expanded resource is the container image, the to-be-executed data packet to an idle physical machine in a resource pool having the binding relationship with the to-be-processed application for execution.

In some embodiments, the execution unit acquires related information of the to-be-expanded resource in the resource pool, and sends the related information of the to-be-expanded resource to a third-party program of the to-be-processed application through a deployment interface configured for the to-be-processed application, the related information being used in the deployment of the to-be-executed data packet on the to-be-expanded resource for execution by the third-party program according to a deployment mode of the third-party program.

In some embodiments, the execution unit executes a post script of the to-be-processed application, the post script being used for at least one of: returning an expansion result to a management node of a cluster; creating a volume for an expansion resource in the resource pool; or cleaning garbage generated by the expansion.

In some embodiments, the apparatus further comprises an establishment unit configured to establish an SSH connection with the to-be-expanded resource, the SSH connection being used for executing a related script of the corresponding application, only one SSH connection being established with the to-be-expanded resource at a time.

In some embodiments, the establishment unit reserves the SSH connection within a preset time period after the execution of the to-be-executed data packet of the corresponding application is finished.

In some embodiments, the apparatus further comprises a contraction unit configured to determine, in the case where the to-be-controlled resource is a to-be-contracted resource, whether there is important data in the to-be-controlled resource and whether there is a service dependent on the to-be-contracted resource; and the contraction unit removes the to-be-contracted resource from the cluster in the case where there is no important data and there is no service dependent on the to-be-contracted resource.

In some embodiments, the contraction unit transfers acquired related information of the to-be-contracted resource through a configured contraction interface, the acquired related information being used in the removal of the to-be-contracted resource from the cluster.

In some embodiments, the contraction unit acquires a contraction result by polling a configured query interface.

In some embodiments, after the contraction unit removes the to-be-contracted resource from the cluster, in the case where the to-be-contracted resource is a physical machine, the addition unit adds the to-be-contracted resource into the resource pool; and in the case where the to-be-contracted resource is a container image, the contraction unit destroys the container image, and the addition unit adds the to-be-contracted resource into the resource pool.

In some embodiments, in the case where the to-be-contracted resource is the physical machine, the execution unit executes a post script of the contraction, the post script being used for starting an installation process to perform operating system reinstallation on the to-be-contracted resource.

According to still other embodiments of the present disclosure, there is provided a control apparatus of cluster resources, comprising: a memory; and a processor coupled to the memory, the processor being configured to perform, based on instructions stored in the memory, the control method of cluster resources in any of the above embodiments.

According to further embodiments of the present disclosure, there is provided a non-volatile computer-readable storage medium having thereon stored a computer program which, when executed by a processor, implements the control method of cluster resources in any of the above embodiments.

According to still further embodiments of the present disclosure, there is provided a cloud computing system, comprising: a control apparatus of cluster resources, which is configured to perform the control method of cluster resources in any of the above embodiments.

BRIEF DESCRIPTION OF THE DRAWINGS

The accompanying drawings described herein are used for providing a further understanding of the present disclosure and constitute a part of this application, and illustrative embodiments of the present disclosure and their description are used for explaining the present disclosure and do not constitute an improper limitation on the present disclosure. In the drawings.

DETAILED DESCRIPTION

Figure 1:
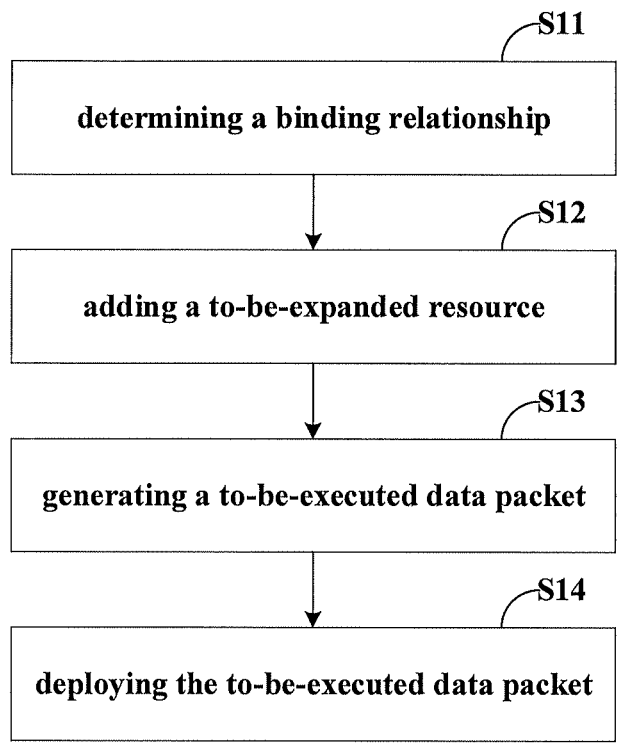
FIG. 1 illustrates a flow diagram of some embodiments of a control method of cluster resources according to the present disclosure.

The technical solutions in the embodiments of the present disclosure will be clearly and completely described below in conjunction with the accompanying drawings in the embodiments of the present disclosure, and it is obvious that the embodiments described are only some of the embodiments of the present disclosure, rather than all of them. The following description of at least one exemplary embodiment is merely illustrative in nature and in no way serves as any limitation on this disclosure and its application or use. All other embodiments, which can be derived by one of ordinary skill in the art from the embodiments in the present disclosure without making creative labor, fall within the protection scope of the present disclosure.

The relative arrangements, numerical expressions and numerical values of components and steps set forth in these embodiments do not limit the scope of the present disclosure unless otherwise specified. Meanwhile, it should be understood that sizes of various portions shown in the drawings are not drawn to actual scales for ease of description. A technique, method, and device known to one of ordinary skill in the related art may not be discussed in detail but should be regarded as part of the granted specification where appropriate. In all examples shown and discussed herein, any specific value should be construed as exemplary only and not as limiting. Therefore, other examples of the exemplary embodiments can have different values. It should be noted that: similar reference numbers and letters refer to similar items in the following drawings, and therefore, once a certain item is defined in one drawing, it need not be discussed further in subsequent drawings.

The inventors of the present disclosure have found that, the related art described above has the following problem: the resource expansion cannot be applied to different business applications, thereby resulting in poor applicability.

In view of this, the present disclosure provides a technical solution for controlling cluster resources, capable of improving the applicability of the resource expansion.

FIG. 1 illustrates a flow diagram of some embodiments of a control method of cluster resources according to the present disclosure.

As shown in FIG. 1, the method comprises: step S11, determining a binding relationship; step S12, adding a to-be-expanded resource; step S13, generating a to-be-executed data packet; and step S14, deploying the to-be-executed data packet.

In the step S11, in the case where a to-be-controlled resource is the to-be-expanded resource, the binding relationship between the to-be-expanded resource and a corresponding application is determined. For example, the to-be-expanded resource can be a physical machine or a container image.

In the step S12, the to-be-expanded resource that is initialized is added into a resource pool of the corresponding application according to the binding relationship.

In some embodiments, related information of the to-be-expanded resource is transferred to a pre-script of the corresponding application; and the pre-script is executed to complete the initialization of the to-be-expanded resource.

In the step S13, according to a deployment (provisioning) type of a to-be-processed application, the to-be-executed data packet of the to-be-processed application is generated.

In some embodiments, in the case where the deployment type is package deployment, a program package of the to-be-processed application is generated as the to-be-executed data packet. In this case, the to-be-expanded resource is a physical machine.

In some embodiments, in the case where the deployment type is image deployment, a program package of the to-be-processed application is generated, and the to-be-executed data packet is generated according to the program package and a running image of the to-be-processed application. In this case, the to-be-expanded resource is a container image.

In the step S14, the to-be-executed data packet is deployed on the corresponding to-be-expanded resource in the resource pool of the to-be-processed application for execution.

In some embodiments, in the case where the to-be-expanded resource is the physical machine, the to-be-executed data packet is sent to the physical machine for execution; and in the case where the to-be-expanded resource is the container image, the to-be-executed data packet is sent to an idle physical machine in a corresponding resource pool (standby pool) for execution. For example, a standby pool is a standby physical machine resource pool in a cloud computing system.

In some embodiments, related information of the to-be-expanded resource is acquired; the related information of the to-be-expanded resource is sent to a third-party program of the to-be-processed application through a deployment interface configured for the to-be-processed application; and the third-party program deploys the to-be-executed data packet on the to-be-expanded resource for execution according to a deployment mode of the third-party program.

In some embodiments, a post script of the to-be-processed application is executed, the post script being used for at least one of: returning an expansion result to a management node of a cluster; creating a corresponding volume for a corresponding expansion resource; and cleaning garbage generated by the expansion.

In some embodiments, an SSH connection with each to-be-expanded resource is established, for executing each related script of the corresponding application, only one SSH connection being established with each to-be-expanded resource at a time.

In some embodiments, after the execution of the to-be-executed data packet of the corresponding application is finished, the SSH connection is reserved within a preset time period, so that the SSH connection will be reused when the to-be-executed data packet of the corresponding application is executed next time.

Figure 2:
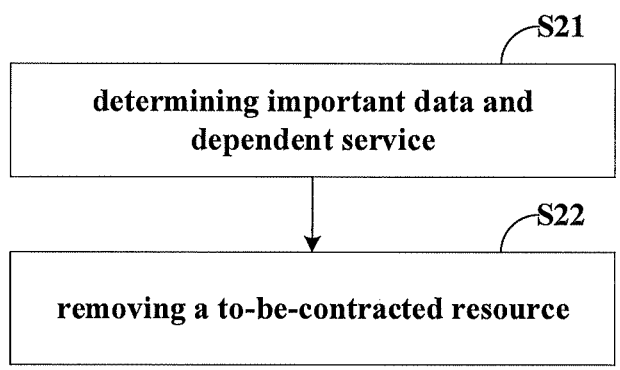
FIG. 2 illustrates a flow diagram of other embodiments of a control method of cluster resources according to the present disclosure.

FIG. 2 shows a flow diagram of other embodiments of a control method of cluster resources according to the present disclosure.

As shown in FIG. 2, the method further comprises: step S21, determining important data and a dependent service; and step S22, removing a to-be-contracted resource.

In the step S21, in the case where the to-be-controlled resource is the to-be-contracted resource, it is determined whether there is important data in the to-be-contracted resource and whether there is a service dependent on the to-be-contracted resource.

In the step S22, in the case where there is no important data and there is no service dependent on the to-be-contracted resource, the to-be-contracted resource is removed from the cluster.

In some embodiments, acquired related information of the to-be-contracted resource can be transferred in the system through a configured contraction interface, so that the to-be-contracted resource is removed from the cluster; and a contraction result is acquired by polling a configured query interface.

In some embodiments, in the case where the to-be-contracted resource is a physical machine, the to-be-contracted resource is added into the resource pool (standby pool); and in the case where the to-be-contracted resource is a container image, the container image is destroyed and the to-be-contracted resource is added into the resource pool.

In some embodiments, in the case where the to-be-contracted resource is the physical machine, a post script of the contraction is executed. The post script is used for starting an installation process to perform operating system reinstallation on the to-be-contracted resource. For example, reinstallation can be implemented by PXE (Preboot eXecution Environment).

In the above embodiment, the data packet of the application is deployed on the corresponding to-be-expanded resource for execution according to the binding relationship between the to-be-expanded resource and the application. In this way, the method can be applied to the resource expansion of different business applications, so that the applicability of the resource expansion is improved.

Figure 3:
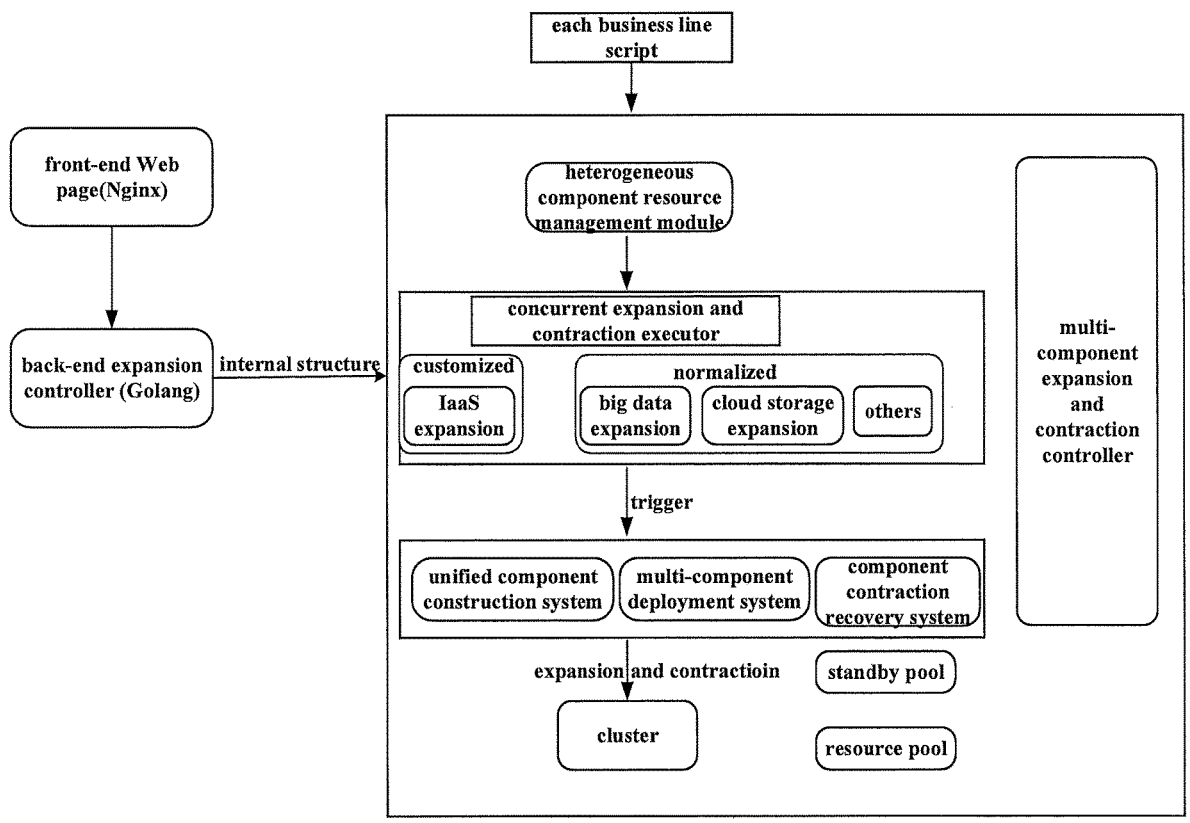
FIG. 3 illustrates a schematic diagram of some embodiments of a control apparatus of cluster resources according to the present disclosure.

FIG. 3 illustrates a schematic diagram of some embodiments of a control apparatus of cluster resources according to the present disclosure.

As shown in FIG. 3, a user can, through a front-end web page, interact with a back-end expansion (or contraction) controller (i.e., the control apparatus). For example, the front-end Web page can be implemented by a Nginx (engine x) server; and the control apparatus can be implemented in a Golang programming language.

An internal structure of the control apparatus can be a unified resource control system directed to a complex proprietary cloud cluster and supporting multi-component concurrent expansion and contraction. Each business line script can be connected with the control apparatus.

For example, the control apparatus can comprise a plurality of modules such as a multi-component expansion and contraction controller, a heterogeneous component resource management module, a concurrent expansion and contraction executor, a unified component construction system, a multi-component deployment system, and a component contraction recovery system.

In some embodiments, the multi-component expansion and contraction controller (for example, comprising a determination unit, an addition unit, etc.) is responsible for controlling overall expansion and contraction processes. For example, the multi-component expansion and contraction controller can coordinate the work of other modules; control and call each module used in the expansion and contraction; and provide necessary data parameters.

In some embodiments, the heterogeneous component resource management module is responsible for managing all metadata required in the expansion and contraction processes. For example, metadata comprises a server (physical machine resource) management IP (Internet Protocol), a server specification parameter, expansion and contraction application data, and the like.

For example, the heterogeneous component resource management module can persistently store data using a relational database MySQL (My Structured Query Language).

For example, the heterogeneous component resource management module can be deployed independently, and provide an OpenAPI (Open Application Programming Interface) call interface to the outside.

In some embodiments, the concurrent expansion and contraction executor (which can comprise, for example, an execution unit, an establishment unit, and the like) is responsible for executing scripts that need to be run by various resource servers at different stages.

For example, a bottom layer of the concurrent expansion and contraction executor can be a connection pool implemented based on an SSH protocol. The concurrent expansion and contraction executor can be implemented by a Golang programming language to guarantee high concurrency. The concurrent expansion and contraction executor can establish an SSH connection between the control apparatus and the to-be-expanded resource.

For example, the concurrent expansion and contraction executor can execute customized expansion and contraction processes. For example, for related applications of IaaS (Infrastructure as a Service), the customized expansion and contraction processes can be executed.

For example, the concurrent expansion and contraction executor can execute normalized expansion and contraction processes. For example, for related applications of other services than big data, cloud storage, and IaaS, the customized expansion and contraction processes can be executed.

For example, the concurrent expansion and contraction executor can trigger the unified component construction system, the multi-component deployment system, and the component contraction recovery system. The unified component construction system, the multi-component deployment system and the component contraction recovery system perform related expansion and contraction processes on a cluster of the cloud computing system.

In some embodiments, the unified component construction system (which can comprise, for example, a generation unit) is responsible for compiling source code online-deployed by each resource server; and preparing, based on a Docker container, different compilation environments for different resource servers. The unified component construction system can implement the isolation of the compilation environment, so that dependent services required by the compilation are not interfered with each other, and therefore, the smoothness of the compilation is ensured.

In some embodiments, the multi-component deployment system (which can comprise, for example, an execution unit) is responsible for online-deploying a compiled program to a specified physical server or container.

For example, the multi-component deployment system can comprise package deployment and image deployment. The package deployment can online-deploy a compiled program to a specified physical machine; and the image deployment can deploy and start a container, according to a running image packed during the compilation and according to the required resource (comprising the number of CPU cores, a memory size, a hard disk size and the like, which are required by the running).

In some embodiments, the component contraction recovery system (which can comprise, for example, a contraction unit, an addition unit) is responsible for recovering a contracted resource.

For example, a recovered container resource will be put into the resource pool again, and a recovered physical machine will be put into a standby pool. The component contraction recovery system will destroy the container resource, and reinstall the recovered physical machine and format its data disk.

Figure 4:
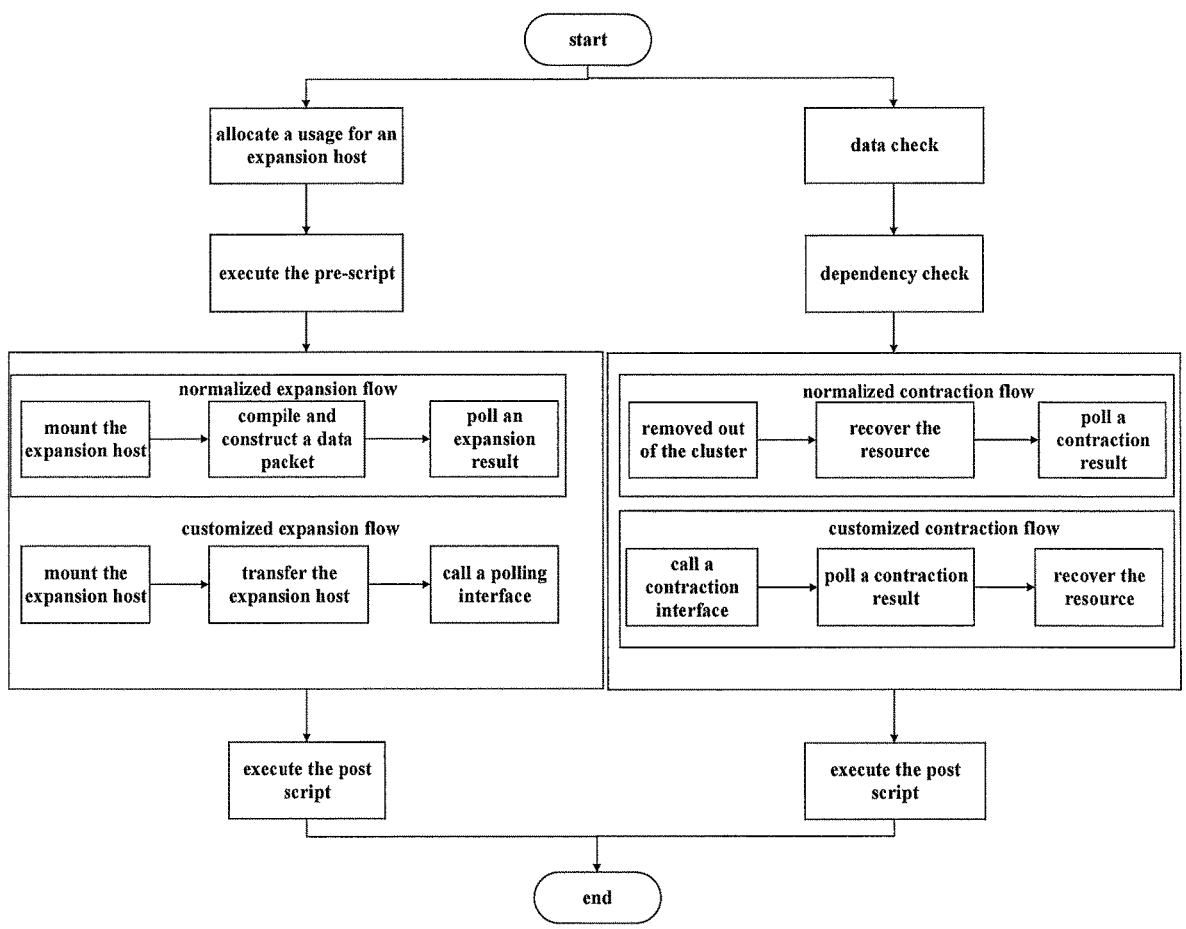
FIG. 4 illustrates a flow diagram of still other embodiments of a control method of cluster resources according to the present disclosure.

FIG. 4 illustrates a flow diagram of still other embodiments of a control method of cluster resources according to the present disclosure.

As shown in FIG. 4, the method can comprise an expansion flow (the left flow in the figure) and a contraction flow (the right flow in the figure). The expansion flow can comprise a normalized expansion flow and a customized expansion flow; the contraction flow can comprise a normalized contraction flow and a customized contraction flow.

For example, expansion and contraction processes of various resource nodes (such as MySQL resource nodes, mass storage resource nodes, and the like) related to IaaS and a cloud database product all belong to customized expansion and contraction flows; and expansion and contraction processes of various resource nodes (such as resource node ds2-datanode and big data resource node datanode) related to cloud storage and data cloud all belong to normalized expansion and contraction flows.

The expansion and contraction flows of the above products need to pass through the following three common flows: allocating usage (namely, binding to-be-expanded and to-be-contracted resources to corresponding product applications), executing a pre-script and executing a post script. These common flows can be extracted to establish a resource control method with high applicability.

In some embodiments, the normalized expansion flow mainly comprises: mounting a to-be-expanded standby machine (resource) into a standby pool of a specified product application; compiling and constructing a program package or running image of the application; deploying the program package or the image to a server in the standby pool; and polling a deployment result. For example, an expansion flow for a data cloud product is mainly for a big data resource node datanode, and the normalized expansion flow can comprise the following steps.

In step 1, a usage is allocated for a to-be-expanded host. For example, a tag of a big data resource node datanode is allocated for a to-be-expanded server (resource), so that the binding between the to-be-expanded resource and an application is realized.

In step 2, a pre-script is executed. For example, the multi-component expansion and contraction controller can, by calling a preset script (pre-script) of a data cloud in a FTP (File Transfer Protocol) directory of a control machine, transfer an IP list of a to-be-expanded server to the preset script as a command line parameter. For example, the control machine can be a computer running the control method of the present disclosure in a cluster.

By executing the expansion script, the initialization of the to-be-expanded server can be completed. The preset script is mainly responsible for initializing the expanded physical machine, for example, installing some basic software packages.

In step 3, a to-be-expanded host is mounted. For example, a to-be-expanded physical machine is mounted into a standby pool of a corresponding product line in a product service tree, to facilitate unified allocation of resources. For example, according to related information of a to-be-deployed product in a cloud computing system, a to-be-expanded resource can be added into a resource pool of a product line to which a bound application belongs.

In some embodiments, related information of a to-be-deployed product in the cloud computing system can be stored in a tree structure. It can be stored, for example, according to a five-level tree structure of department, product line, product, system, application.

In step 4, a data packet is compiled and constructed. For example, according to a deployment type of an application, a program package of the application is compiled and constructed. If it is packet deployment that is used by a big data resource node datanode, a corresponding program packet is compiled as a to-be-processed data packet; and for image deployment, the program package and a running image are packaged together to generate a to-be-processed data packet. The compiled and constructed program package is transferred onto a bound to-be-expanded machine in a standby pool, and a starting script is executed.

In step 5, an expansion result is polled. For example, the deployment can be regularly polled, and a deployment result can be recorded in a deployment unit of CMDB (Configuration Management Database) of an information management module. A Web front-end can inquire the deployment result through an API interface and present the deployment result to the user.

In step 6, a post script is executed to process post-expansion affairs. For example, the post script can notify a management node in a cluster of an expanded resource node, so that the expansion of the cluster is completed.

In some embodiments, for a cloud storage expansion flow, the expansion of a resource node ds2-datanode is mainly completed, and its flow steps are similar to those of the above data cloud. However, the post script of the cloud storage expansion flow can perform a process of creating a volume.

In some embodiments, the normalized contraction flow can comprise business data check, dependent service check, removal out of cluster, resource recovery, polling result, executing post script. For example, the normalized contraction flow can comprise the following steps.

In step 1, the business data check is performed on the to-be-contracted resource to determine whether there is important data in the to-be-contracted resource. If there is important data, the to-be-contracted resource does not support the contraction.

In step 2, the dependent service check is performed on the to-be-contracted resource to determine whether there is a service that depends on the to-be-contracted resource for running. If there is dependent service, the to-be-contracted resource does not support the contraction.

In step 3, the management node of the cluster is notified of removing the to-be-contracted resource out of the cluster.

In step 4, the component contraction recovery system is called to recover the contracted resource.

In step 5, a contraction result is polled.

In step 6, a post script is executed to process post-contraction affairs. For example, a PXE installation operation for resource recovery can be triggered.

In some embodiments, the customized expansion flow can comprise: mounting a to-be-expanded standby machine into a standby pool of a specified product application; providing, by a third party, its own expansion program (third-party program), wherein the expansion program provides two normalized expansion interfaces, namely a triggering-expansion interface (deployment interface) and a querying-expansion-result interface (query interface); the multi-component expansion and contraction controller calls the triggering-expansion interface to transfer information of the to-be-expanded standby machine in a form of parameters; polling the expansion result through the querying-expansion-result interface.

For example, for an application of an IaaS product, a customized expansion flow can be realized by the following steps.

In step 1, a usage is allocated to a to-be-expanded host. For example, a tag of a resource node of an IaaS product application is allocated for a to-be-expanded server.

In step 2, a pre-script is executed. For example, the multi-component expansion and contraction controller calls a preset script of a data cloud in a FTP directory of a control machine, and transfers an IP list of an expansion machine as a command line parameter to the preset script; and executes an expansion script to complete the initialization of the machine. The preset script is mainly responsible for initializing the expanded physical machine, for example, installing some basic software packages.

In step 3, the to-be-expanded host is mounted. For example, a to-be-expanded physical machine is mounted into a standby pool of a corresponding product line in a service tree of a product, for unified acquisition by a third-party program.

In step 4, the to-be-expanded host is transferred. For example, the multi-component expansion and contraction controller triggers a deployment interface of IaaS, and acquires related information of a to-be-expanded server from CMDB of an information management module; the related information is transferred to the IaaS product in a form of parameters; an IaaS product deployment program acquires the to-be-expanded server deployed from the standby pool; and an IaaS deployment service deploys IaaS product online according to self-owned business.

In step 5, a polling interface is called. For example, the multi-component expansion and contraction controller regularly polls an expansion result of IaaS; the deployment result is recorded into a deployment unit of CMDB of an information management module; and a Web front-end can query the deployment result through an API interface and present the deployment result to a user.

In step 6, a post script is executed. This step can be empty if the product does not have the post script.

In some embodiments, the customized contraction flow can comprise business data check, dependent service check, calling customized contraction interface, polling contraction result, recovering resource to resource pool or standby pool, and executing post script. For example, the customized contraction flow can be realized by the following steps.

In step 1, business data check is performed on the to-be-contracted resource to determine whether there is important data in the to-be-contracted resource. If there is important data, the to-be-contracted resource does not support the contraction.

In step 2, dependent service check is performed on the to-be-contracted resource to determine whether there is a service that depends on the to-be-contracted resource for running. If there is dependent service, the to-be-contracted resource does not support the contraction.

In step 3, the customized contraction interface is called to transfer related information of the to-be-contracted resource.

In step 4, the customized contraction result interface (query interface) is polled to acquire a contraction result.

In step 5, the recovered resource is put into the resource pool or the standby pool.

Figure 5:
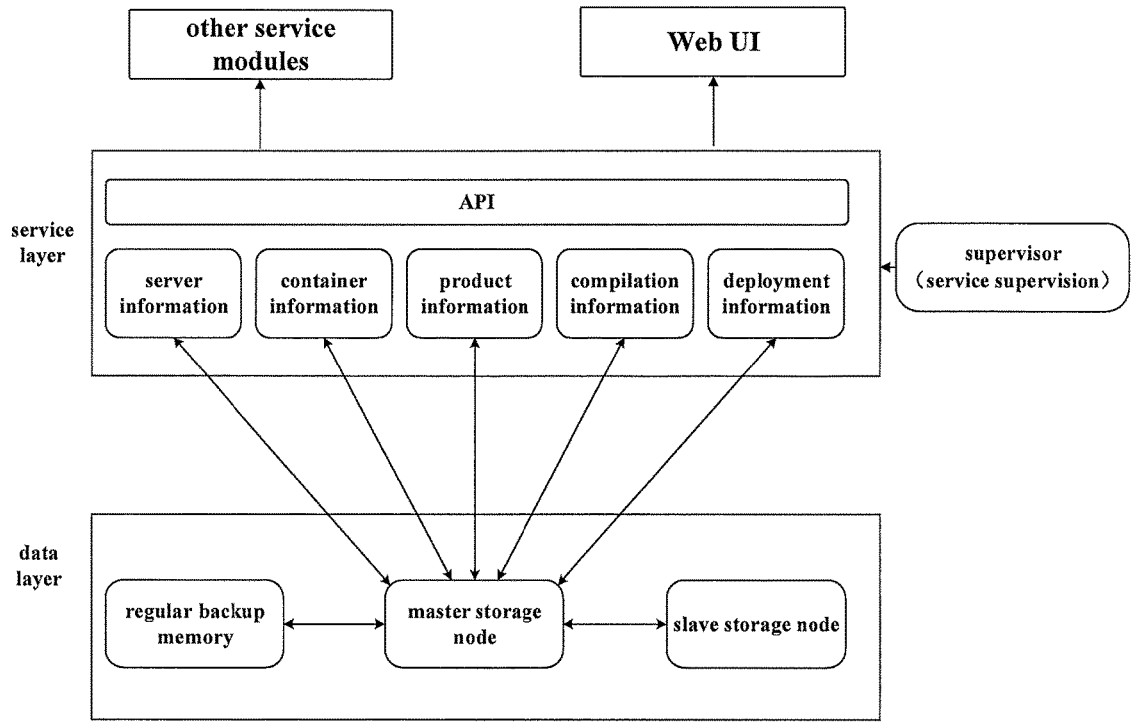
FIG. 5 illustrates a schematic diagram of other embodiments of a control apparatus of cluster resources according to the present disclosure.

FIG. 5 illustrates a schematic diagram of other embodiments of a control apparatus of cluster resources according to the present disclosure.

As shown in FIG. 5, the heterogeneous component resource management module is mainly composed of a service layer and a data layer, and provides metadata to other service modules and a Web front-end UI (User Interface) through an Http (HyperText Transfer Protocol) API. A supervisor can perform service supervision on the heterogeneous component resource management module.

In some embodiments, the service layer can comprise an API server, a server information management unit, a container information management unit, a product information management unit, a compilation information management unit, and a deployment information management unit.

For example, the API Server can be a Http Server developed based on Golang. The API server provides a Restful (Representational State Transfer) style interface to the outside, and is responsible for providing internally managed data to a user safely and legally.

For example, the server information management unit is mainly responsible for managing all physical machine information in a cluster. The physical machine information can comprise a management node server, a used resource node server and a standby machine of a to-be-expanded/contracted resource. The server information management unit can manage full server information, and can provide necessary information for subsequent deployment, configuration and recovery of the servers.

For example, the container information management unit is responsible for managing information of all container within a cluster. The container information can comprise the number of CPU cores, a memory size, a hard disk size, which are used when a container runs, and a physical machine to which the container belongs, a product application, and the like.

For example, the product information management unit is responsible for managing information of products deployed within a proprietary cloud. The product information can adopt a tree structure. The tree structure can be divided according to a five-level structure of department, product line, product, system and application. Before expansion and contraction, it is needed to allocate a to-be-expanded/contracted physical machine to a specific system application, to facilitate centralized management of the expansion and contraction flows.

For example, the compilation information management unit is responsible for managing a compilation program of each product application. The compilation information management unit can be developed based on Jenkins, and support automatically pulling code from a source code repository (gitlab). The compilation information management unit can, according to configuration information, compile and construct a binary program or image (comprising a running image and a program package) of an application.

For example, a deployment information management unit is responsible for deploying a compiled program package or a packaged image to a specified physical machine or container, and recording all deployment records.

The data layer can comprise a master storage node, a slave storage node, and a memory. The master storage node stores various information sent by the service layer and synchronously backs up the information to the slave storage node. For example, data in the master storage node can be regularly backed up into a memory, so that backup data is acquired in the case where both the master storage node and the slave storage node are polluted.

Figure 6:
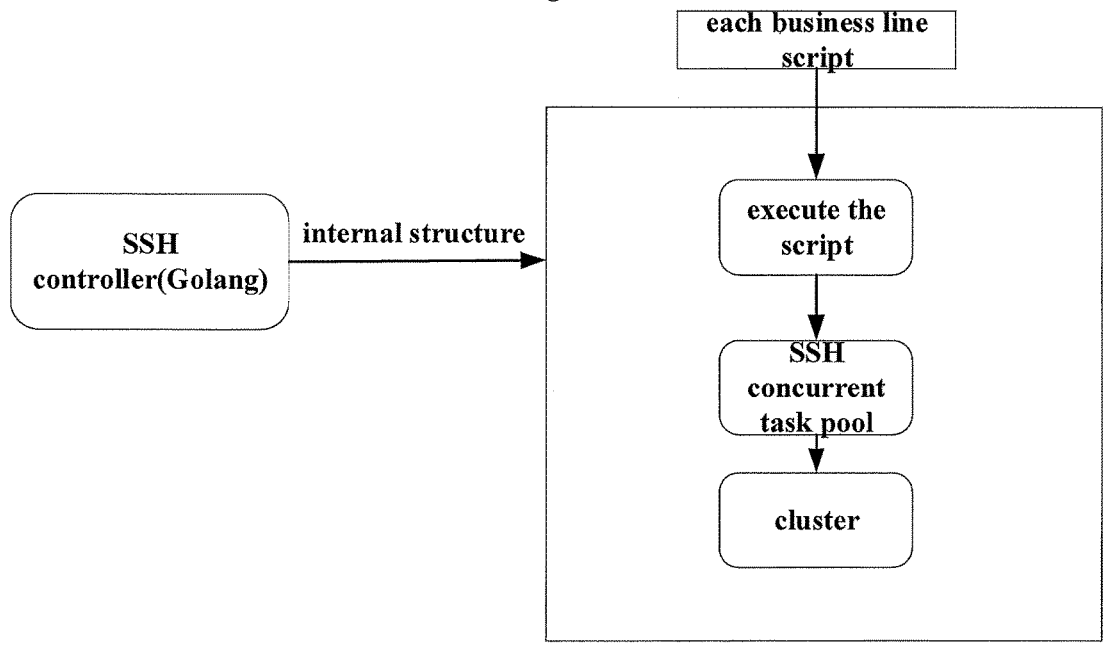
FIG. 6 illustrates a schematic diagram of still other embodiments of a control apparatus of cluster resources according to the present disclosure.

FIG. 6 illustrates a schematic diagram of still other embodiments of a control apparatus of cluster resources according to the present disclosure.

As shown in FIG. 6, the multi-component expansion and contraction controller can be a SSH controller constructed by Golang. Each business line script can be connected with the internal structure of the multi-component expansion and contraction controller.

In some embodiments, the multi-component expansion and contraction controller, when executing the pre-script and the post script, needs the help of the concurrent expansion and contraction executor. For example, a bottom layer of the concurrent expansion and contraction executor is a Golang-based high-performance SSH concurrent connection pool, in which SSH connections with various to-be-expanded resources are included.

For example, on the basis of the connection pool, a series of operation interfaces for connecting physical machines, executing script commands, and the like can be encapsulated. Due to the high concurrency characteristic of the Golang language, combined with the above connection pool, large-scale concurrent operations on the server and the container can be ensured, so that the efficiency of the execution of expansion and contraction is improved.

For example, in order to ensure operation safety, the connection pool only establishes one SSH connection for each to-be-expanded or to-be-contracted resource (physical machine, container image), and regularly cleans an expired SSH connection.

Figure 7:
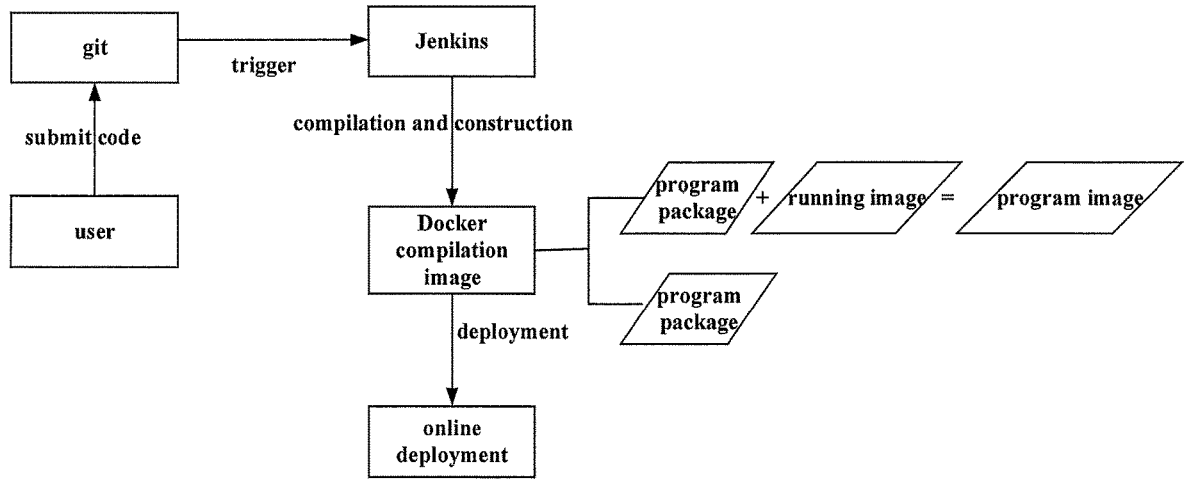
FIG. 7 illustrates a schematic diagram of some embodiments of a control method of cluster resources according to the present disclosure.

FIG. 7 illustrates a schematic diagram of some embodiments of a control method of cluster resources according to the present disclosure.

As shown in FIG. 7, the method comprises: submitting, by a user, related code to a git distributed version control system; triggering, by the git, the Jenkins to automate the compilation, construction and online deployment flows of the server. For example, the triggering of the compilation and construction flow can comprise manual triggering, and automatic triggering after a user submits code.

Jenkins performs compilation construction and compilation image through Docker, and performs online deployment. For example, a program package or program image can be produced based on a type of the application. If it is packet deployment that is used by a big data resource node datanode, only a program package is produced by compilation construction, and a running image is not included; and if it is a image deployment type, the program package and the running image can be packaged together into the program image.

Figure 8:
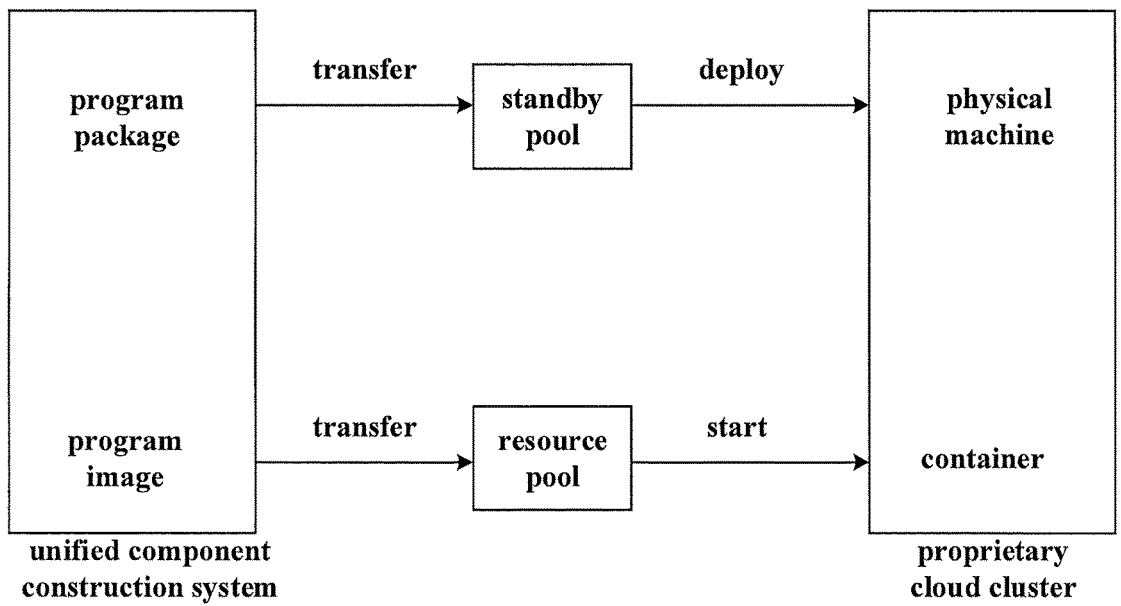
FIG. 8 illustrates a schematic diagram of further embodiments of a control apparatus of cluster resources according to the present disclosure.

FIG. 8 shows a schematic diagram of further embodiments of a control apparatus of cluster resources according to the present disclosure.

As shown in FIG. 8, after an application program is compiled and constructed, the multi-component expansion and contraction controller transfers, through the concurrent expansion and contraction executor, the data packet compiled and constructed by the unified component construction system to the to-be-expanded physical machine or the idle machine in the resource pool, according to the type of the expansion application.

In the case of performing expansion on a physical machine program package, the multi-component deployment system executes a starting script, deploys the program package on a physical machine of the proprietary cloud cluster for running, and checks an execution state; and in the case of program image deployment, the multi-component deployment system starts a image and checks a running state of a container of the proprietary cloud cluster.

Figure 9:
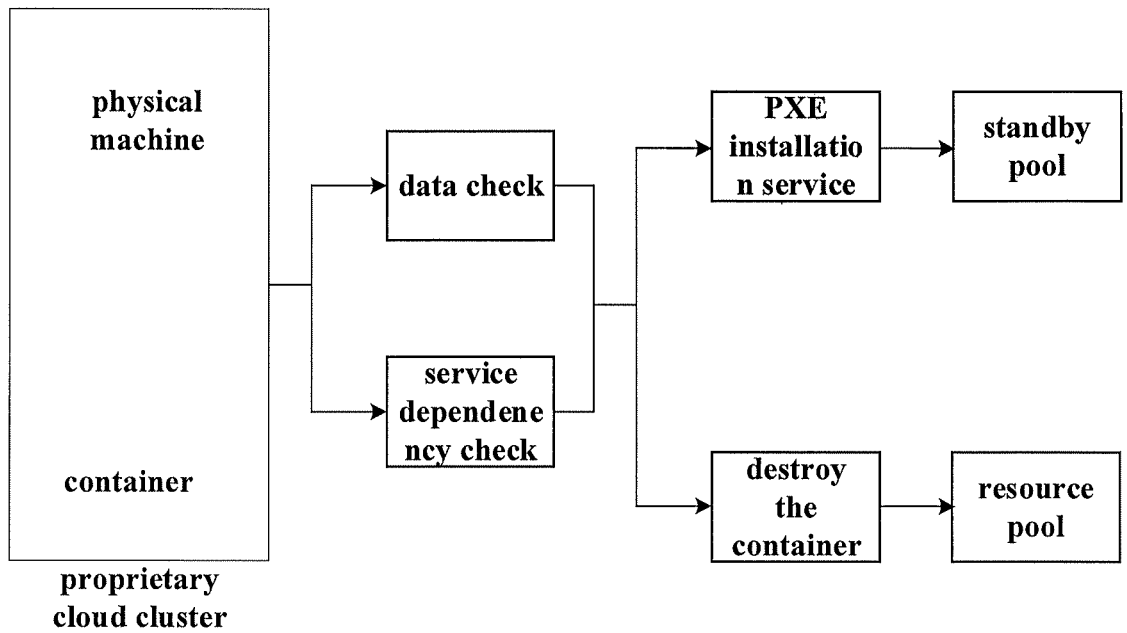
FIG. 9 illustrates a schematic diagram of further embodiments of a control apparatus of cluster resources according to the present disclosure.

FIG. 9 illustrates a schematic diagram of further embodiments of a control apparatus of cluster resources according to the present disclosure.

As shown in FIG. 9, the component contraction recovery system performs container resource recovery and physical machine resource recovery according to the type of the application deployment. In the case where the recovered application is a physical machine of the proprietary cloud cluster, the component contraction recovery system adds the physical machine into the standby pool and calls PXE to reinstall the system; and in the case where the recovered application is a program image (container) of the proprietary cloud cluster, the component contraction recovery system will destroy the container and recover the resource to the resource pool.

In some embodiments, before the contraction, the component contraction recovery system needs to check whether there already has business data in the contraction server or the container; moreover, the component contraction recovery system needs to check whether the contraction server or the container has deployed a service on which another application is dependent. In the case where there is the business data or dependent service, the component contraction recovery system exits the contraction process.

In some embodiments, in order to clean the deployed service on the physical machine, the component recovery system can start a PXE installation process, and after operating system reinstallation is performed on the contraction physical machine and its data disk is formatted, the contraction resource is put into the standby pool; or after the container is destroyed, the contraction resource is put into the resource pool.

Figure 10:
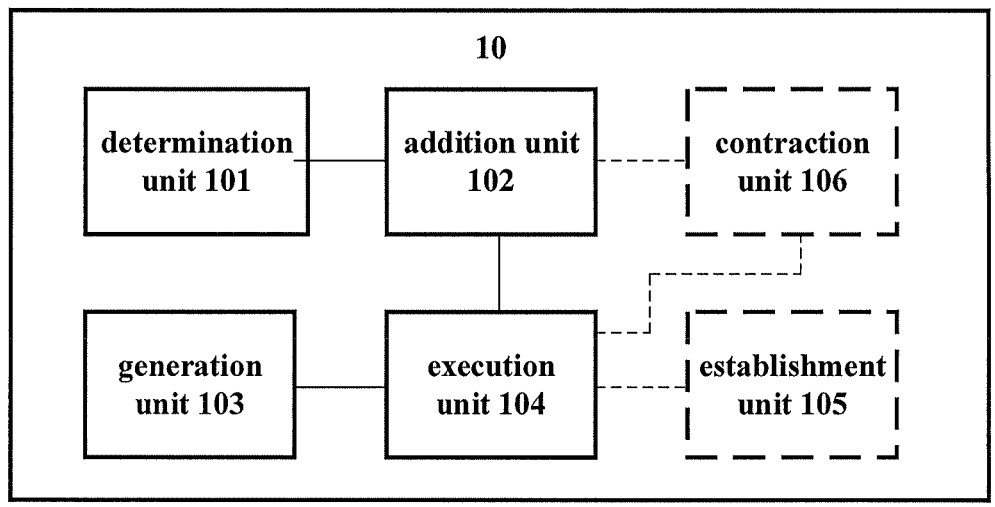
FIG. 10 illustrates a block diagram of some embodiments of a control apparatus of cluster resources according to the present disclosure.

FIG. 10 illustrates a block diagram of some embodiments of a control apparatus of cluster resources according to the present disclosure.

As shown in FIG. 10, the control apparatus 10 of cluster resources comprises a determination unit 101, an addition unit 102, a generation unit 103, and an execution unit 104.

The determination unit 101 determines, in the case where a to-be-controlled resource is a to-be-expanded resource, a binding relationship between the to-be-expanded resource and a corresponding application.

The addition unit 102 adds the to-be-expanded resource that is initialized into a resource pool of the corresponding application according to the binding relationship.

In some embodiments, the addition unit 102 transfers related information of the to-be-expanded resource to a pre-script of the corresponding application, and executes the pre-script to complete the initialization of the to-be-expanded resource.

The generation unit 103 generates, according to a deployment type of a to-be-processed application, a to-be-executed data packet of the to-be-processed application.

In some embodiments, in the case where the deployment type is package deployment, the to-be-expanded resource is a physical machine, and the generation unit 103 generates a program package of the to-be-processed application as the to-be-executed data packet; in the case where the deployment type is image deployment, the to-be-expanded resource is a container image, the generation unit 103 generates a program package of the to-be-processed application, and generates the to-be-executed data packet according to the program package and a running image of the to-be-processed application.

The execution unit 104 deploys the to-be-executed data packet on the corresponding to-be-expanded resource in the resource pool of the to-be-processed application for execution.

In some embodiments, the execution unit 104, in the case where the to-be-expanded resource is the physical machine, sends the to-be-executed data packet to the physical machine for execution; the execution unit 104, in the case where the to-be-expanded resource is the container image, sends the to-be-executed data packet to an idle physical machine in a corresponding resource pool for execution.

In some embodiments, the execution unit 104 acquires the related information of the to-be-expanded resource, and sends the related information of the to-be-expanded resource to a third-party program of the to-be-processed application through a deployment interface configured for the to-be-processed application, so that the third-party program deploys the to-be-executed data packet on the to-be-expanded resource for execution according to a deployment mode of the third-party program.

In some embodiments, the execution unit 104 executes a post script of the to-be-processed application, the post script being used for at least one of: returning an expansion result to a management node of a cluster; creating a corresponding volume for the corresponding expansion resource; or cleaning garbage generated by the expansion.

In some embodiments, the control apparatus 10 of the cluster resources further comprises an establishment unit 105 configured to establish an SSH connection with the to-be-expanded resource. The SSH connection is used for executing related script of the corresponding application. The establishment unit 105 can establish only one SSH connection with the to-be-expanded resource at a time.

In some embodiments, the establishment unit 105 reserves the SSH connection within a preset time period after the execution of the to-be-executed data packet of the corresponding application is finished.

In some embodiments, the control apparatus 10 of cluster resources further comprises a contraction unit 106 configured to determine, in the case where the to-be-controlled resource is a to-be-contracted resource, whether there is important data in the to-be-contracted resource and whether there is a service dependent on the to-be-contracted resource; and the contraction unit 106 removes, in the case where there is no important data and there is no service dependent on the to-be-contracted resource, the to-be-contracted resource from the cluster.

In some embodiments, the contraction unit transfers acquired related information of the to-be-contracted resource through a configured contraction interface, so that the to-be-contracted resource is removed from the cluster.

In some embodiments, the contraction unit 106 acquires a contraction result by polling a configured query interface.

In some embodiments, after the contraction unit 106 removes the to-be-contracted resource from the cluster, in the case where the to-be-contracted resource is a physical machine, the addition unit 102 adds the to-be-contracted resource into the resource pool; in the case where the to-be-contracted resource is a container image, the contraction unit 106 destroys the container image, and the addition unit adds the to-be-contracted resource into the resource pool.

In some embodiments, in a case where the to-be-contracted resource is the physical machine, the execution unit 104 executes a post script of the contraction, the post script being used to start an installation process to perform operating system reinstallation on the to-be-contracted resource.

In the above embodiments, the data packet of the application is deployed on the to-be-expanded resource for execution according to the binding relationship between the to-be-expanded resource and the application. In this way, the apparatus can be applied to the resource expansion of different business applications, so that the applicability of the resource expansion is improved.

Figure 11:
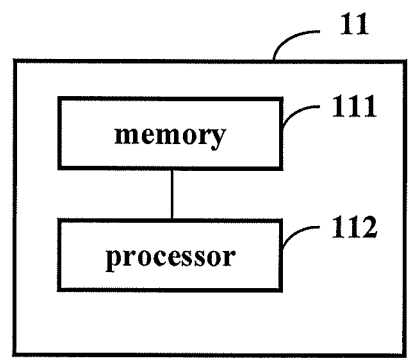
FIG. 11 illustrates a block diagram of other embodiments of a control apparatus of cluster resources according to the present disclosure.

FIG. 11 illustrates a block diagram of other embodiments of a control apparatus of cluster resources according to the present disclosure.

As shown in FIG. 11, the control apparatus 11 of cluster resources of this embodiment comprises: a memory 111 and a processor 112 coupled to the memory 111, the processor 112 being configured to perform, based on instructions stored in the memory 111, the control method of cluster resources in any of the embodiments of the present disclosure.

The memory 111 can comprise, for example, a system memory, a fixed non-volatile storage medium, and the like. The system memory has thereon stored, for example, an operating system, application, boot loader, database, other programs, and the like.

Figure 12:
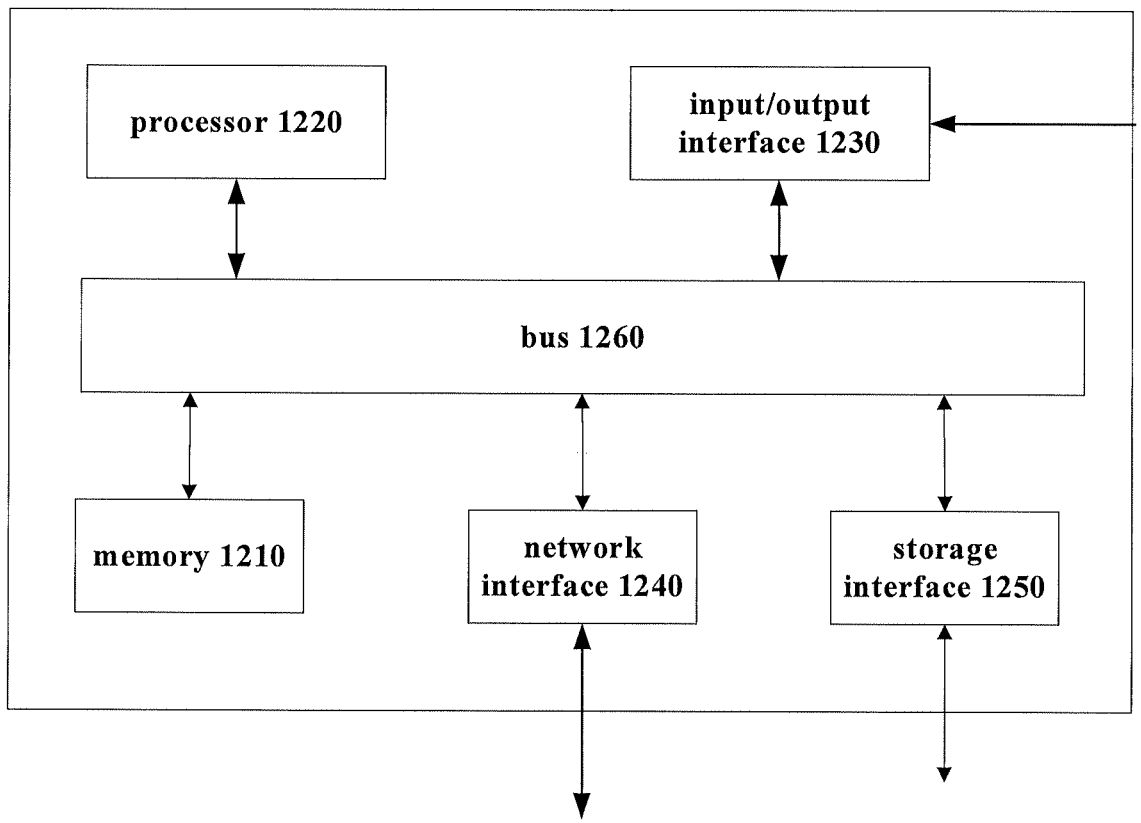
FIG. 12 illustrates a block diagram of still other embodiments of a control apparatus of cluster resources according to the present disclosure.

FIG. 12 illustrates a block diagram of still other embodiments of a control apparatus of cluster resources according to the present disclosure.

As shown in FIG. 12, the control apparatus 12 of cluster resources of this embodiment comprises: a memory 1210 and a processor 1220 coupled to the memory 1210, the processor 1220 being configured to perform, based on instructions stored in the memory 1210, the control method of cluster resources in any of the above embodiments.

The memory 1210 can comprise, for example, a system memory, fixed non-volatile storage medium, and the like. The system memory has thereon stored, for example, an operating system, application, boot loader, other programs, and the like.

The control apparatus 12 of cluster resources can further comprise an input/output interface 1230, a network interface 1240, a storage interface 1250, and the like. These interfaces 1230, 1240, 1250, as well as the memory 1210 and the processor 1220, can be connected, for example, through a bus 1260. The input/output interface 1230 provides a connection interface for input/output devices such as a display, a mouse, a keyboard, and a touch screen. The network interface 1240 provides a connection interface for a variety of networking devices. The storage interface 1250 provides a connection interface for external storage devices such as an SD card and a USB flash disk.

It should be appreciated by those skilled in the art that, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-available non-transitory storage media having computer-available program code embodied therein.

Figure 13:
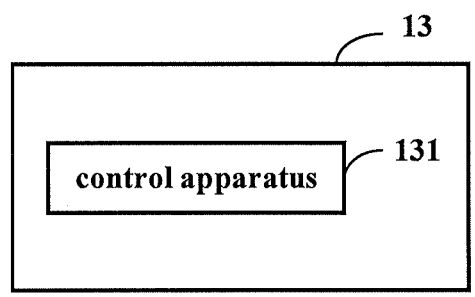
FIG. 13 illustrates a block diagram of some embodiments of a control system of cluster resources according to the present disclosure.

FIG. 13 illustrates a block diagram of some embodiments of a control system of cluster resources according to the present disclosure.

As shown in FIG. 13, a cloud computing system 13 comprises a control apparatus 131 of cluster resources, which is configured to perform the control method of cluster resources in any of the above embodiments.

It should be appreciated by those skilled in the art that, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-available non-transitory storage media (including, but not limited to, a disk memory, CD-ROM, optical memory, and the like) having computer-available program code embodied therein.

So far, the description has been made in detail according to the present disclosure. Some details well known in the art have not been described in order to avoid obscuring the concepts of the present disclosure. Those skilled in the art can now fully appreciate how to implement the technical solutions disclosed herein, in view of the foregoing description.

The method and system of the present disclosure may be implemented in a number of ways. The method and system of the present disclosure can be implemented, for example, in software, hardware, firmware, or any combination of software, hardware, and firmware. The above order for the steps of the method is for illustration only, and the steps of the method of the present disclosure are not limited to the order specifically described above unless specifically stated otherwise. Furthermore, in some embodiments, the present disclosure can also be implemented as programs recorded in a recording medium, the programs comprising machine-readable instructions for implementing the method according to the present disclosure. Therefore, the present disclosure also covers the recording medium having thereon stored the program for executing the method according to the present disclosure.

Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. A control method of cluster resources, comprising:
in response to a to-be-controlled resource being a to-be-expanded resource, determining a binding relationship between the to-be-expanded resource and an application, wherein the to-be-expanded resource is a physical machine or a container image;
initializing the to-be-expanded resource and adding the to-be-expanded resource that is initialized into a resource pool of a corresponding application having the binding relationship with the to-be-expanded resource;
generating a to-be-executed data packet of a to-be-processed application according to a deployment type of the to-be processed application, comprising: in response to the deployment type being package deployment, determining that the to-be-expanded resource is a physical machine, and generating a program package of the to-be-processed application as the to-be-executed data packet;
in response to the deployment type being image deployment, determining that the to-be-expanded resource is a container image, generating a program package of the to-be-processed application, and generating the to-be-executed data packet according to the program package and a running image of the to-be-processed application; and
deploying the to-be-executed data packet on the to-be-expanded resource in the resource pool of the to-be-processed application for execution, comprising:
in response to the to-be-expanded resource being the physical machine, sending the to-be-executed data packet to the physical machine for execution;
in response to the to-be-expanded resource being the container image, sending the to-be-executed data packet to an idle physical machine in a resource pool having the binding relationship with the to-be-processed application for execution;
the control method further comprising:
establishing a Secure Shell (SSH) connection with the to-be-expanded resource, for executing a related script of the corresponding application, only one SSH connection being established with the to-be-expanded resource at a time.

2. The control method according to claim 1, wherein the initializing the to-be-expanded resource comprises:
transferring related information of the to-be-expanded resource to a pre-script of the corresponding application; and
executing the pre-script to complete the initialization of the to-be-expanded resource.

3. The control method according to claim 1, wherein the deploying the to-be-executed data packet on the to-be-expanded resource in the resource pool of the application for execution comprises:
acquiring related information of the to-be-expanded resource in the resource pool; and
sending the related information of the to-be-expanded resource to a third-party program corresponding to the to-be-processed application through a deployment interface configured for the to-be-processed application, the related information being used in the deployment of the to-be-executed data packet on the to-be-expanded resource for execution by the third-party program according to a deployment mode of the third-party program.

4. The control method according to claim 1, further comprising executing a post script of the to-be-processed application, the post script being used for at least one of:
returning a result of an expansion to a management node of a cluster;

creating a volume for a resource of the expansion in the resource pool; or cleaning garbage generated by the expansion.

5. The control method according to claim 1, further comprising:

after the execution of the to-be-executed data packet of the corresponding application is finished, reserving the SSH connection within a preset time period.

6. The control method according to claim 1, further comprising:

in response to the to-be-controlled resource being a to-be-contracted resource, determining whether there is business data in the to-be-contracted resource and whether there is a service dependent on the to-be-contracted resource; and in response to there being no business data and there being no service dependent on the to-be-contracted resource, removing the to-be-contracted resource from the cluster.

7. The control method according to claim 6, wherein the removing the to-be-contracted resource from the cluster comprises:

transferring acquired related information of the to-be-contracted resource through a configured contraction interface, the acquired related information being used in the removal of the to-be-contracted resource from the cluster; and the control method further comprises acquiring a contraction result by polling a configured query interface.

8. The control method according to claim 6, further comprising:

after the to-be-contracted resource is removed from the cluster, in response to the to-be-contracted resource being a physical machine, adding the to-be-contracted resource into the resource pool; and in response to the to-be-contracted resource being a container image, destroying the container image and adding the to-be-contracted resource into the resource pool.

9. The control method according to claim 8, further comprising:

in response to the to-be-contracted resource being the physical machine, executing a post script of contraction, the post script being used for starting an installation process to perform operating system reinstallation on the to-be-contracted resource.

10. A control apparatus of cluster resources, comprising:
a memory; and
a processor coupled to the memory, the processor being configured to perform, based on instructions stored in the memory, a control method of cluster resources comprising:

in response to a to-be-controlled resource being a to-be-expanded resource, determining a binding relationship between the to-be-expanded resource and an application, wherein the to-be-expanded resource is a physical machine or a container image;

initializing the to-be-expanded resource and adding the to-be-expanded resource that is initialized into a resource pool of a corresponding application having the binding relationship with the to-be-expanded resource;

generating a to-be-executed data packet of a to-be-processed application according to a deployment type of the to-be-processed application, comprising: in response to the deployment type being package deployment, determining that the to-be-expanded resource is a physical machine, and generating a program package of the to-be-processed application as the to-be-executed data packet; in response to the deployment type being image deployment, determining that the to-be-expanded resource is a container image, generating a program package of the to-be-processed application, and generating the to-be-executed data packet according to the program package and a running image of the to-be-processed application; and deploying the to-be-executed data packet on the to-be-expanded resource in the resource pool of the to-be-processed application for execution, comprising:

in response to the to-be-expanded resource being the physical machine, sending the to-be-executed data packet to the physical machine for execution; in response to the to-be-expanded resource being the container image, sending the to-be-executed data packet to an idle physical machine in a resource pool having the binding relationship with the to-be-processed application for execution;

the control method further comprising:

establishing a Secure Shell (SSH) connection with the to-be-expanded resource, for executing a related script of the corresponding application, only one SSH connection being established with the to-be-expanded resource at a time.

11. A cloud computing system, comprising:
the control apparatus of cluster resources according to claim 10.

12. The control apparatus according to claim 10, wherein the initializing the to-be-expanded resource comprises:

transferring related information of the to-be-expanded resource to a pre-script of the corresponding application; and executing the pre-script to complete the initialization of the to-be-expanded resource.

13. The control apparatus according to claim 10, wherein the deploying the to-be-executed data packet on the to-be-expanded resource in the resource pool of the application for execution comprises:

acquiring related information of the to-be-expanded resource in the resource pool; and sending the related information of the to-be-expanded resource to a third-party program corresponding to the to-be-processed application through a deployment interface configured for the to-be-processed application, the related information being used in the deployment of the to-be-executed data packet on the to-be-expanded resource for execution by the third-party program according to a deployment mode of the third-party program.

14. The control apparatus according to claim 10, wherein the processor is further configured to executing a post script of the to-be-processed application, the post script being used for at least one of:

returning a result of an expansion to a management node of a cluster;

creating a volume for a resource of the expansion in the resource pool; or cleaning garbage generated by the expansion.

15. A non-transitory computer-readable storage medium having thereon stored a computer program which, when executed by a processor, implements a control method of cluster resources comprising:

in response to a to-be-controlled resource being a to-be-expanded resource, determining a binding relationship between the to-be-expanded resource and an application, wherein the to-be-expanded resource is a physical machine or a container image;

initializing the to-be-expanded resource and adding the to-be-expanded resource that is initialized into a resource pool of a corresponding application having the binding relationship with the to-be-expanded resource;

generating a to-be-executed data packet of a to-be-processed application according to a deployment type of the to-be-processed application, comprising: in response to the deployment type being package deployment, determining that the to-be-expanded resource is a physical machine, and generating a program package of the to-be-processed application as the to-be-executed data packet; in response to the deployment type being image deployment, determining that the to-be-expanded resource is a container image, generating a program package of the to-be-processed application, and generating the to-be-executed data packet according to the program package and a running image of the to-be-processed application; and deploying the to-be-executed data packet on the to-be-expanded resource in the resource pool of the to-be processed application for execution, comprising in response to the to-be-expanded resource being the physical machine, sending the to-be-executed data packet to the physical machine for execution; in response to the to-be-expanded resource being the container image, sending the to-be-executed data packet to an idle physical machine in a resource pool having the binding relationship with the to-be-processed application for execution;

the control method further comprising:

establishing a Secure Shell (SSH) connection with the to-be-expanded resource, for executing a related script of the corresponding application, only one SSH connection being established with the to-be-expanded resource at a time.

* * * * *